US006218037B1

United States Patent
Greiner et al.

(10) Patent No.: US 6,218,037 B1
(45) Date of Patent: Apr. 17, 2001

(54) PROCESS FOR THE PRODUCTION OF AN INSULATING COMPONENT FOR A HIGH TEMPERATURE FUEL CELL, AND HIGH TEMPERATURE FUEL CELL

(75) Inventors: Horst Greiner, Forchheim; Karl Kempter, München, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/133,702

(22) Filed: Aug. 13, 1998

(30) Foreign Application Priority Data

Aug. 13, 1997 (EP) .................................................. 97114006

(51) Int. Cl.⁷ ..................................................... H01M 2/00
(52) U.S. Cl. ............................. 429/34; 429/12; 29/623.1; 428/307.3
(58) Field of Search ................................ 429/34, 35, 36, 429/45; 29/623.1; 428/319.1, 307.3

(56) References Cited

U.S. PATENT DOCUMENTS 5,834,108 * 11/1998 Shimai et al. ..................... 428/307.3
5,866,275 * 2/1999 Kawasaki et al. ...................... 429/30
5,868,918 * 2/1999 Adler et al. ........................... 205/615
5,942,348 * 11/1998 Jansing et al. ........................ 429/32

FOREIGN PATENT DOCUMENTS

4224906A1   2/1994   (DE) .
19608727C1   6/1997   (DE) .

OTHER PUBLICATIONS

Published International Application No. 94/07808 (Hessel et al.), dated Apr. 14, 1994.
"Fuel Cell Handbook", A.J. Appleby et al., 1989, pp. 440 to 454.

* cited by examiner

Primary Examiner—Stephen Kalafut
Assistant Examiner—Ray Alejandro
(74) Attorney, Agent, or Firm—Herbert L. Lerner; Laurence A. Greenberg; Werner H. Stemer

(57) ABSTRACT

A process for the production of an insulating component from a ceramic material for a high temperature fuel cell includes the following steps: In a first step, a ceramic material is converted into a dispersion by wet preparation with a water-soluble binder. In a second step, the dispersion is poured to form a water-containing layer. In a third step, the water-containing layer is converted at elevated temperature to form a rubbery layer. In a fourth step, the binder is burnt off from the rubbery layer at elevated temperature. In a fifth step, the layer from which the binder has been burnt off is set at elevated temperature. In a sixth and a seventh step, the layer which has been set is processed in accordance with the dimensions of the insulating component and consolidated by sintering.

12 Claims, 2 Drawing Sheets

PROCESS FOR THE PRODUCTION OF AN INSULATING COMPONENT FOR A HIGH TEMPERATURE FUEL CELL, AND HIGH TEMPERATURE FUEL CELL

BACKGROUND OF THE INVENTION

Field of the Invention

The invention relates to a process for the production of an insulating component for a high temperature fuel cell, and to a high temperature fuel cell.

It is known that, during the electrolysis of water, water molecules are decomposed by electric current into hydrogen ($H_2$) and oxygen ($O_2$). In a fuel cell, that process takes place in reverse. Electrical current is produced with high efficiency through electrochemical combination of hydrogen ($H_2$) and oxygen ($O_2$) to form water. When pure hydrogen ($H_2$) is used as the combustible gas, the process takes place without the emission of pollutants and carbon dioxide ($CO_2$). Even with a technical combustible gas, for example natural gas or coal gas, and with air (which may also be enriched with oxygen ($O_2$)) instead of pure oxygen ($O_2$), a fuel cell produces considerably less pollutants and less carbon dioxide ($CO_2$) than other forms of energy production which operate with fossil energy sources. The technical implementation of that principle has given rise to a variety of solutions, specifically with different electrolytes and with operating temperatures of between 80° C. and 1000° C.

Fuel cells are classified as low, medium and high temperature fuel cells according to their operating temperature, and they in turn differ over a variety of technical embodiments.

In high temperature fuel cell stacks (a fuel cell stack is also abbreviated as "stack" in the specialist literature) composed of a large number of high temperature fuel cells, at least one protective layer, a contact layer, an electrolyte/electrode unit, a further contact layer, and a further interconnecting conducting plate, etc. are disposed in that order under an upper interconnecting conducting plate which covers the high temperature fuel cell stack.

In that case, the electrolyte/electrode unit includes two electrodes and a solid electrolyte which is constructed in the form of a membrane and is disposed in between the two electrodes. That being the case, an electrolyte/electrode unit lying between two neighboring interconnecting conducting plates respectively forms a high temperature fuel cell, with the contact layers bearing directly on both sides of the electrolyte/electrode unit. Both sides of each of the two interconnecting conducting plates which bear on the contact layers also belong to the high temperature fuel cell. That and other types of fuel cells are, for example, known from the "Fuel Cell Handbook" by A. J. Appleby and F. R. Foulkes, 1989, Pages 440 to 454.

In regions where there is no electrolyte/electrode unit provided between neighboring interconnecting conducting plates, it is necessary for the interconnecting conducting plates to be electrically insulated from one another. In order to provide partial electrical insulation of neighboring interconnecting conducting plates from one another, an insulating component is provided which has the form of a frame. Feedthroughs are provided in the insulating component for gaseous working media for the electrolyte/electrode unit. Neighboring feedthroughs (which feed different working media) must be isolated in a gas-tight manner from one another. Further, the insulating component must ensure that no working medium reaches the outside of the high temperature fuel cell, i.e. for example the environment. The material of the insulating component must therefore be impermeable to gases, and at the same time should not exhibit any electrical conductivity.

The production of an insulating component of that type for a high temperature fuel cell proves highly elaborate. In one production process known from the prior art, the insulating component is applied directly to the interconnecting conducting plate (i.e. the components to be joined together, in that case the interconnecting conducting plates, are directly involved in the production process). The composition in the surface of the interconnecting conducting plate is partially altered, at least in the short term. Further, mechanical damage to the surface of the interconnecting conducting plate may occur during the production process.

In a further process known from the prior art for producing the insulating component (wherein the insulating component is formed for the most part of a ceramic material) the insulating component is produced by the use of ceramic manufacturing techniques (for example pressing and sintering plates, adjusting the thicknesses of the components by grinding, structuring by using a laser, etc.). In that process, considerably more material is used for the processing than is ultimately needed for the finished insulating component. Both processes prove very involved and cost-intensive.

SUMMARY OF THE INVENTION

It is accordingly an object of the invention to provide a simple and cost-efficient process for the production of an insulating component from a ceramic material for a high temperature fuel cell, and a high temperature fuel cell, which overcome the hereinafore-mentioned disadvantages of the heretofore-known methods and devices of this general type.

With the foregoing and other objects in view there is provided, in accordance with the invention, a process for the production of an insulating component from a ceramic material for a high temperature fuel cell, which includes several steps: In a first step, a ceramic material is converted into a dispersion by wet preparation with a water-soluble binder. Next, in a second step, the dispersion is poured to form a water-containing layer. In a third step, the latter is converted at elevated temperature to form a rubbery layer. Next, in a fourth step, the binder is burnt off from the rubbery layer at elevated temperature. In a fifth step, the layer from which the binder has been burnt off (and is thus virtually free of binder) is set at elevated temperature before then being processed in a sixth step and a seventh step to form the insulating component. In this case, the insulating component is consolidated by sintering and given its final dimensions. It is possible for the consolidation by sintering to represent the seventh step if a change in volume occurring during the consolidation by sintering can be neglected or is already sufficiently taken into account in shaping before the calcination.

In the process, the dispersion ("dispersion" is the term for a system which is made up of several phases, one of which is continuous and at least another of which is finely divided) of the ceramic material and the water-soluble binder are poured to form an aqueous layer. In this case, the amount of dispersion (which is also referred to as a slick) may be proportioned in just such a way that it approximately corresponds to the amount needed for the insulating component. No unnecessary material costs are therefore entailed in the process. Actually, before the layer is processed in the sixth step to give the final geometrical shape of the insulating component, the layer is set at elevated temperature in the fifth step. This ensures that, after the insulating component has been processed, for example by using mechanical measures or using a laser, it undergoes only moderate further shrinkage (in a predictable manner). Therefore, after it has been consolidated by sintering in the seventh step, the insulating component has the desired geometrical dimensions for use in the high temperature fuel cell. All possible ceramic materials may be dealt with by using the process, so long as they have the desired insulating properties. The process thus proves simple to carry out, with the further result that the costs for the production process as a whole are reduced.

In accordance with another mode of the invention, the water-containing layer has a thickness of between 500 and 800 µm. Layer thicknesses for the insulating component are achieved by using this process, which are suitable for use in high temperature fuel cells. In order to meet specific mechanical requirements (for example load-bearing capacity under mechanical stresses), several insulating components, (which then each have a thickness of less than 500 µm) may be used directly above or below one another in the high temperature fuel cell.

In accordance with a further mode of the invention, in this case the dispersion may be poured in a mold, in which it can also be heated as well in order to form the rubbery layer or the layer from which the binder has been burnt off or the set layer, in the further course of the process. If the mold in which it is poured already (taking into account the changes in the volume of the material during the further process steps) approximately corresponds to the dimensions for the finished component, a semi-finished article is obtained. That article subsequently only needs to undergo minor further processing in order to reach the final dimensions of the insulating component.

In accordance with an added mode of the invention, the conversion in the third step is carried out at a temperature of between 80 and 140° C. for a duration of between 2 and 10 hours.

In accordance with an additional mode of the invention, the binder is burnt off in the fourth step at a temperature of between 200 and 600° C., with a duration of between 1 and 4 hours being estimated for this step. The temperatures and durations which are indicated have proved successful in practice.

In accordance with yet another mode of the invention, the setting in the fifth step is carried out a temperature of between 1400 and 1600° C. for a duration of at most 60 hours.

In accordance with yet a further mode of the invention, the consolidation by sintering in the sixth or seventh step takes place at a temperature of between 1500 and 1800° C. for a duration of at most 60 hours. The consolidation of sintering should be carried out at a higher temperature than the setting.

With the objects of the invention in view, there is also provided a high temperature fuel cell containing at least one insulating component produced in accordance with this process.

Other features which are considered as characteristic for the invention are set forth in the appended claims.

Although the invention is illustrated and described herein as embodied in a process for the production of an insulating component for a high temperature fuel cell, and a high temperature fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
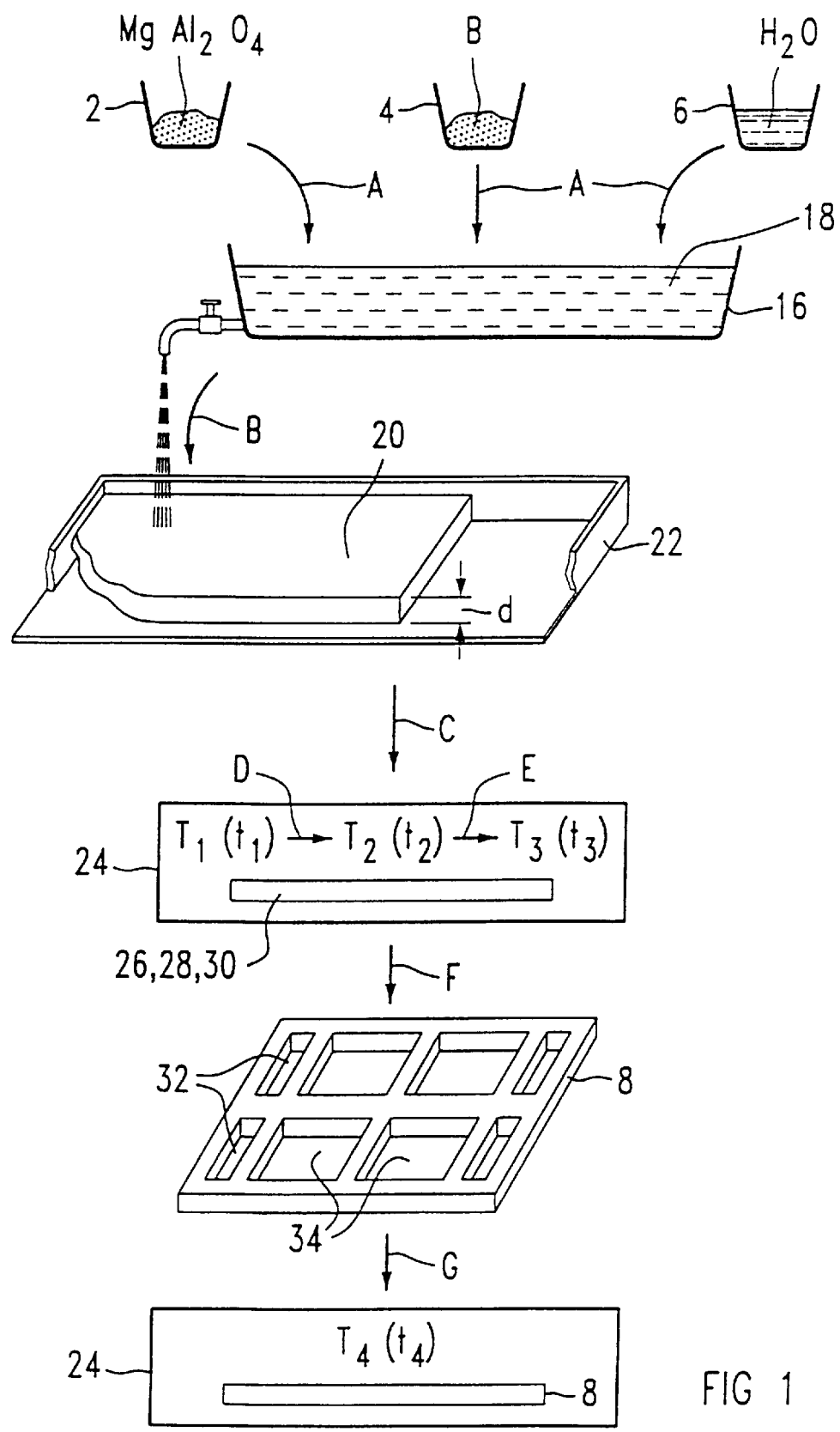
FIG. 1 is a diagrammatic representation showing a sequence of an exemplary process of the invention for the production of an insulating component from a ceramic material for a high temperature fuel cell.

Referring now to the figures of the drawings in detail and first, particularly, to FIG. 1 thereof, there are seen three storage containers 2, 4 and 6. The storage container 2 contains magnesium aluminate ($MgAl_2O_4$). Magnesium aluminate is also referred to as spinel and has an octahedral crystal structure. Spinel is suitable as a ceramic material for an insulating component 8 in a high temperature fuel cell 10 seen in FIG. 2, if interconnecting conducting plates 12, 14 of the high temperature fuel cell 10 which are to be assembled are formed of a chromium-based alloy. The term chromium-based alloy is intended to mean an alloy containing chromium (Cr) as its main constituent. The storage container 4 contains a water-soluble binder, and the storage container 6 contains water ($H_2O$) for the production of a dispersion.

In a first step A, about 90% by weight of the spinel from the storage container 2 and about 10% by weight of the binder from the storage container 4 are converted portionwise in a vessel 16, with the addition of water ($H_2O$) from the storage container 6, to form a dispersion 18.

Next, in a second step B, the dispersion 18 (which is also referred to as a slick) is poured to form a water-containing layer 20 on a suitable mold-like support 22. The aqueous layer 18 has a thickness d of between 500 and 800µm. In order to ensure an approximately constant thickness d of the layer 20, it may be smoothed by mechanical processing, for example with a blade.

The water-containing layer 20 is converted in a third step C at a temperature $T_1$ of between 80 and 140° C. in an oven 24 for a duration $t_1$ of between 2 and 10 hours to form a rubbery layer 26. The rubbery layer 26 is often referred to as a green sheet.

In a fourth step D, the binder is burnt off in the oven 24 at a temperature $T_2$ of between 200 and 600° C. for a duration $t_2$ of between 1 and 4 hours. A binder-free layer 28 is obtained.

Next, the binder-free layer 28 is converted in a fifth step E, likewise in the oven 24, at a temperature $T_3$ of between 1400 and 1600° C. for a duration $t_3$ of at most 60 hours, to form a set layer 30. The state of the set layer 30 is also referred to as white ceramic. The set layer 30 already has a porosity of less than 20%. It has the ideal state for being processed to give it a particular shape.

In a sixth step F, the set layer 30 is then processed to form the insulating component 8. In other words, the set layer 30 is processed mechanically (for example by milling or boring) or by a laser. The insulating component 8 already receives approximately its final shape (i.e. also in terms of its length dimension) through this processing. During this processing, feedthroughs 32 for supplying working media and holes 34 for positioning electrolyte/electrode units are made in the insulating component. The processing to form the insulating component 8 after the fifth step E, in which it is set, proves highly advantageous since microcracks which may possibly occur during the processing terminate by virtue of the structure at porous inhomogenities in the set layer 30. Undesired crack formation is therefore substantially avoided.

In a seventh step G (the last step in the process) the already set insulating component 8 is consolidated by sintering, that is to say hardened once more for it to be used. The consolidation by sintering is preferably carried out at a temperature $T_4$ of between 1500 and 1800° C. for a duration $t_4$ of about 60 hours.

After the consolidation by sintering has been carried out, the insulating component 8 has its final shape. The changes in the length dimension of the insulating component 8 during the consolidation by sintering can be taken into account in a defined manner in the sixth step F.

According to a further refinement, a $MgO/Al_2O_3$ mixture is used as the ceramic material for producing the insulating component 8. In this case, a particularly suitable composition for the mixture is one in which selections are made at about 63% by weight of magnesium oxide (MgO) and 37% by weight of aluminum oxide ($Al_2O_3$).

Figure 2:
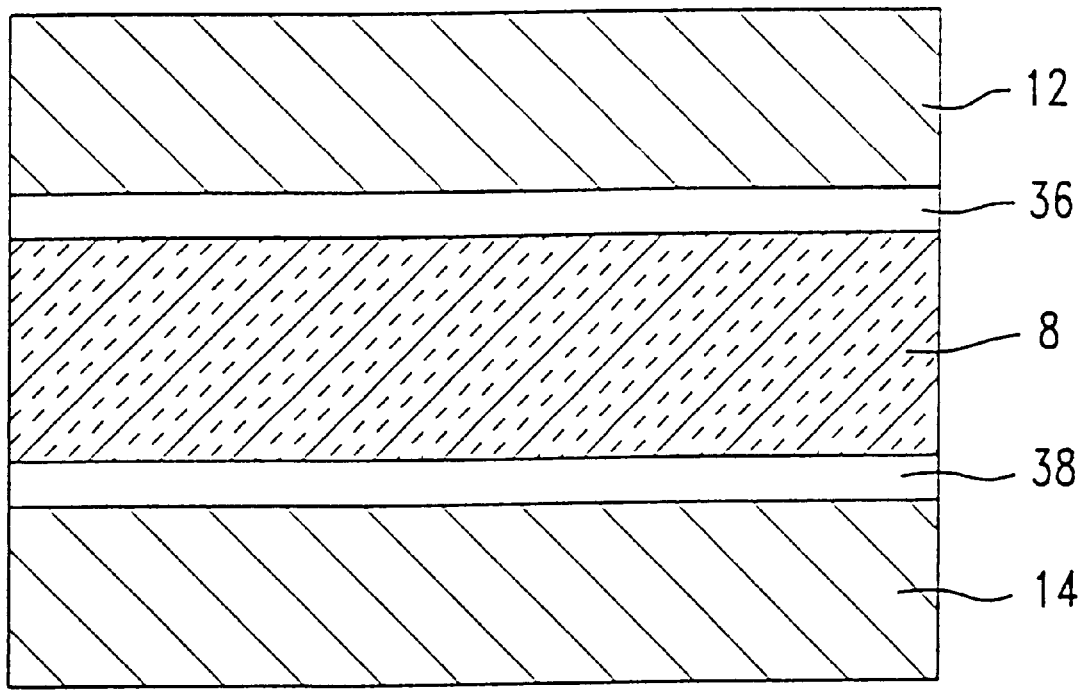
FIG. 2 is an enlarged, sectional view of a high temperature fuel cell.

According to the illustration of a high temperature fuel cell 10 represented in FIG. 2, the insulating component 8 is disposed between the two interconnecting conducting plates 12, 14 to be joined together. The feedthroughs 32 and the holes 34 in the insulating component 8 of FIG. 1 cannot be seen. The insulating component 8 which is produced in accordance with the process represented in FIG. 1 is coupled to the interconnecting conducting plates 12 and 14 through vitreous layers 36, 38.

The interconnecting conducting plates 12, 14 contain a chromium-based alloy, and the insulating component 8 is formed of spinel. The insulating layer 8 is connected to the interconnecting conducting plates 12, 14 integrally and in a gas-tight manner by the vitreous layers 36, 38. The vitreous layers 36, 38 are preferably formed of a soldering glass free of alkaline metal oxides.

It is possible for the insulating component 8 to be produced in the prescribed thickness according to the process represented in FIG. 1, depending on the desired distance between the two interconnecting conducting plates 12, 14. The process is therefore particularly suitable for the production of high temperature fuel cells.

We claim:

1. A process for the production of an insulating component for a high-temperature fuel cell, which comprises:
   in a first step, converting a ceramic material into a dispersion by wet preparation with water and a water-soluble binder;
   in a second step, pouring the dispersion to form a water-containing layer;
   in a third step, converting the water-containing layer at elevated temperature to form a rubbery layer;
   in a fourth step, burning-off the binder from the rubbery layer at elevated temperature;
   in a fifth step, setting the layer, from which the binder has been burnt off, at elevated temperature until a state of "white ceramic" is reached;
   in a sixth step, processing the set layer in accordance with dimensions of the insulating component; and
   in a seventh step, consolidating the set layer by sintering.

2. The process according to claim 1, which comprises pouring the water-containing layer to a thickness of between 500 and 800 μm in the second step.

3. The process according to claim 1, which comprises pouring the dispersion in a mold in the second step.

4. The process according to claim 1, which comprises carrying out the conversion at a temperature of between 80 and 140° C. in the third step.

5. The process according to claim 1, which comprises carrying out the third step for a duration of between 2 and 10 hours.

6. The process according to claim 1, which comprises burningoff the binder at a temperature of between 200 and 600° C. in the fourth step.

7. The process according to claim 1, which comprises carrying out the fourth step for a duration of between 1 and 4 hours.

8. The process according to claim 1, which comprises carrying out the setting at a temperature of between 1400 and 1600° C. in the fifth step.

9. The process according to claim 1, which comprises carrying out the fifth step for a duration of at most 60 hours.

10. The process according to claim 1, which comprises carrying out the consolidation by sintering at a temperature of between 1500 and 1800° C. in the seventh step.

11. The process according to claim 1, which comprises carrying out the seventh step for a duration of at most 60 hours.

12. A high temperature fuel cell having the insulating component produced by the process of claim 1.

* * * * *